Aug. 22, 1961  A. W. VANCE  2,997,237
TIME SEQUENCED SERVO MULTIPLIER
Filed May 7, 1949  2 Sheets-Sheet 1
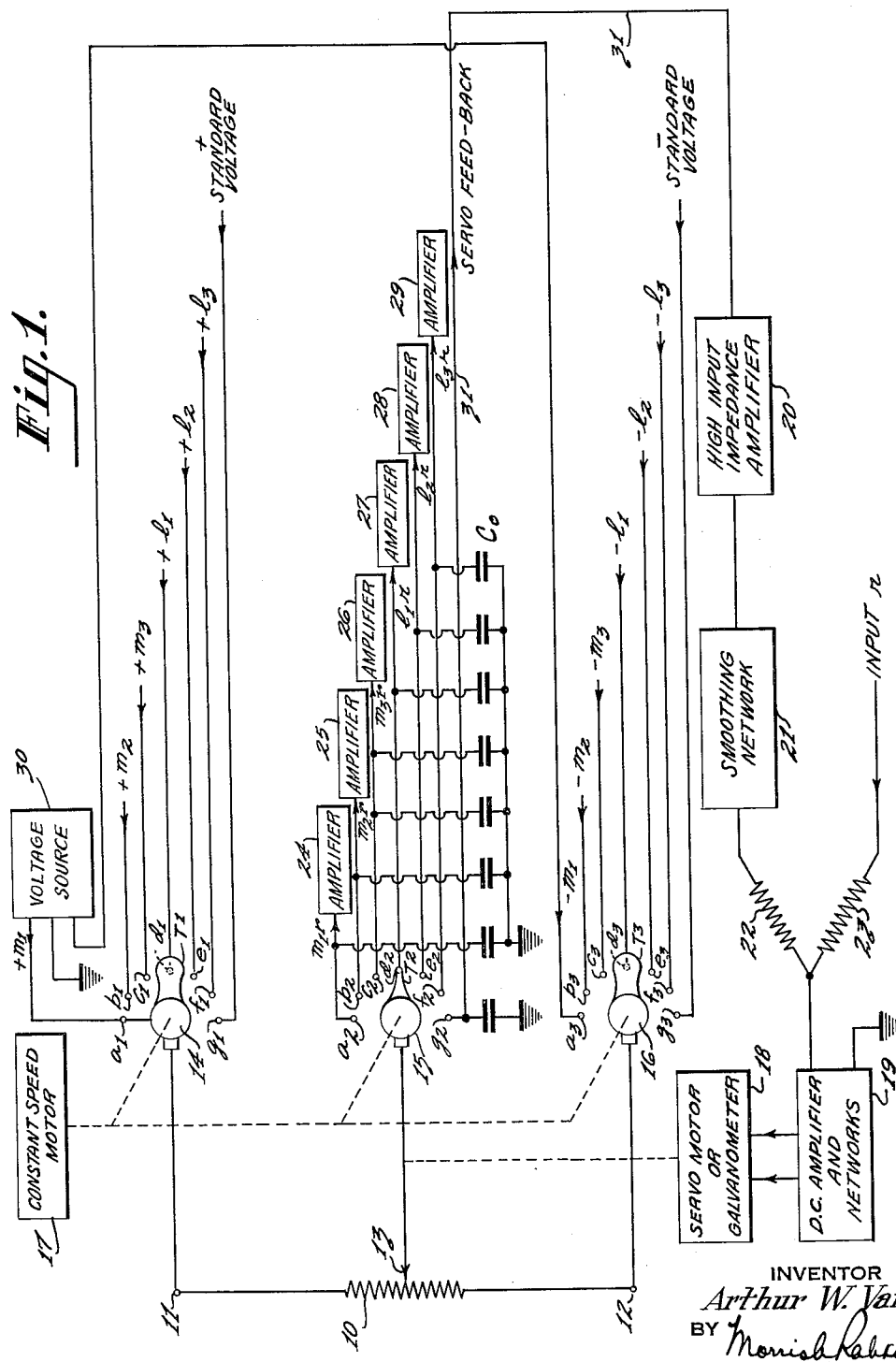
INVENTOR
*Arthur W. Vance*
BY
ATTORNEY

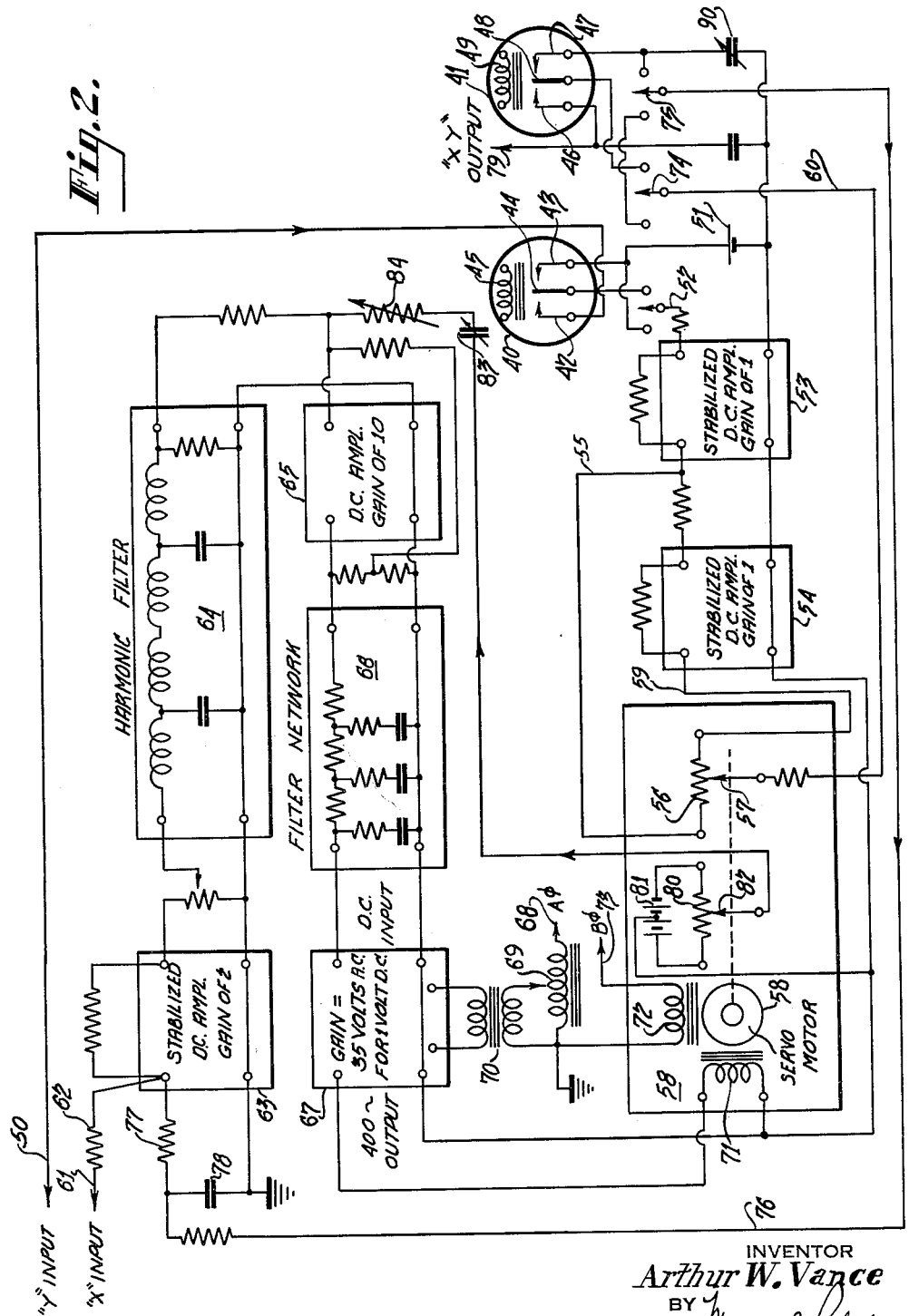

United States Patent Office 2,997,237
Patented Aug. 22, 1961

2,997,237
TIME SEQUENCED SERVO MULTIPLIER
Arthur W. Vance, Union Valley, N.J., assignor to Radio Corporation of America, a corporation of Delaware
Filed May 7, 1949, Ser. No. 91,981
12 Claims. (Cl. 235—194)

This invention relates to computing devices which are adapted (1) to multiply a series of multiplicands by the same multiplier or (2) to derive the product of a single multiplicand and a multiplier.

This multiplying device is of the time sequenced servo type. It is essentially an ordinary servo-multiplier with a commutated input to the multiplying potentiometer. Instead of putting several precision units on one shaft and then attempting to obtain precise tracking, one inexpensive carbon potentiometer is used and the servo output, together with the multiplicands or the multiplicand, is commutated across it. The speed of commutation is such that the relatively slow moving servo does not follow it and the setting of the potentiometer changes by a negligible amount during commutation. Thus, it is possible to obtain a servo multiplier of good accuracy which has a multiple input. This potentiometer has its movable contact positioned according to the multiplier so that there is derived from it a voltage representative of the product. Through this movable contact is also completed the circuit of the feedback loop of the servomotor.

A first modification of the improved multiplier includes a potentiometer which has its end terminals and its movable contact member connected to contacts which are moved at constant speed so that each contact sweeps over a different series of fixed contacts during each successive cycle of its movement. The position of the movable contact member of the potentiometer is controlled by a servomotor or galvanometer which is energized from a summing D.C. amplifier which may be stabilized for zero and drift as disclosed in my copending application Ser. No. 90,358, filed April 29, 1949, now Patent No. 2,685,000.

The input to this amplifier is connected to the common terminal of a pair of summing resistors which have their other terminals connected respectively to a source of voltage representative of a multiplier $r$ and to a capacitor through a smoothing network and an amplifier. This capacitor is arranged to be connected to the movable contact of the potentiometer when its end terminals are connected to the standard voltage source. Under these conditions, the charge of the capacitor is such that the average output current of the amplifier is very closely equal and opposite to the amplifier input current produced by the voltage $r$ which is representative of the value of the multiplier.

Voltages representative of the multiplicands $m_1$, $m_2$, $m_3$, $l_1$, $l_2$ and $l_3$ are each applied to a different pair of the remaining fixed contacts of the series arranged to be connected to the end terminals of the potentiometer. By moving the contacts connected to them and to the movable member of the potentiometer at an appropriate speed, voltages representative of the products $m_1r$, $m_2r$, $m_3r$, $l_1r$, $l_2r$, and $l_3r$ are made available at the remaining fixed contacts which are arranged to be connected to the movable member of the potentiometer and are coupled to ground through separate capacitors.

A second modification of the multiplying device differs from that described in that the commutator of the first modification is replaced by vibrators having their fixed contacts differently spaced, the smoothing network is connected between the servomotor and the input amplifier and a derivative potentiometer controlled by the servomotor is arranged to provide damping in the servo loop.

Thus, the invention has for its principal object the provision of an improved multiplying device and method of operation whereby a series of products may be derived successively. Other objects of the invention are (1) the provision of an improved multiplying device which is capable of continuously deriving the successive products of a multiplier and a series of multiplicands, (2) the provision of an improved multiplier which involves relatively few parts, (3) the provision of a multiplier of the servo type which does not require extremely precise tracking between a number of accurate potentiometers and (4) the provision of improved means for damping the servo loop of a servomotor.

The invention will be better understood from the following description considered in connection with the accompanying drawings and its scope is indicated by the appended claims.

Referring to the drawings:

FIG. 1 illustrates a form of the invention adapted to derive the products of a plurality of multiplicands multiplied by a single multiplier, and FIG. 2 shows a modification of one of the multiplying elements of the device of FIG. 1.

Referring more particularly to the drawings, FIG. 1 shows the multiplying device as applied to the problem of multiplying six multiplicands $m_1$, $m_2$, $m_3$, $l_1$, $l_2$ and $l_3$ by a multiplier $r$. Obviously, the number of fixed contacts may be such as to multiply a greater or smaller number of multiplicands by a given multiplier.

The multiplying device includes a potentiometer 10 which may be of the granular carbon type and which includes end terminals 11 and 12 and a movable contact member 13. The terminal 11 is connected through a slip ring 14 to a contact $T_1$, the member 13 is connected through a slip ring 15 to a contact $T_2$ and the terminal 12 is connected through a slip ring 16 to a contact $T_3$. All of the contacts $T_1$, $T_2$, and $T_3$ are driven at constant speed by a motor 17 as indicated by broken lines extending between the motor and the driving shafts of the contacts. As the motor 17 rotates, each of the contacts $T_1$, $T_2$, and $T_3$ sweeps over its cooperating fixed contacts $a_1$ to $g_1$, $a_2$ to $g_2$ or $a_3$ to $g_3$, respectively.

The position of the movable member 13 is controlled by a servomotor or galvanometer 18 which is energized from an amplifier 19. The amplifier 19 may be stabilized for zero and drift and functions in response to (1) a servo feedback voltage applied through the fixed contacts $g_1$, $g_2$, and $g_3$, a high impedance amplifier 20, a smoothing network 21 and a summing resistor 22, and (2) a voltage which is proportional to the value of the multiplier $r$ and is applied through a summing resistor 23.

Voltages proportional to the values of the various multiplicands are applied between corresponding fixed contacts of the first and third groups of fixed contacts. Thus, the voltage between the fixed contacts $a_1$ and $a_3$ is representative of the value of the multiplicand $m_1$, the voltage between the fixed contacts $b_1$ and $b_3$ is representative of the multiplicand $m_2$, etc.

In the operation of the device, the carbon potentiometer 10 is rapidly switched by means of the contacts $T_1$, $T_2$ and $T_3$ into seven different circuits in sequence as illustrated. When the contacts are in the lower position, the potentiometer is excited by a standard, constant D.C. voltage. The arm 13 of the potentiometer is connected at this time by a lead 31 to the input of the high input impedance amplifier 20 whose input is connected across a capacitor $C_0$ and whose output completes the feedback loop through the smoothing network 21 into the input of the D.C. amplifier. As in any servo system, the motor turns the arm in a direction to restore the effective input current to the amplifier to very nearly zero following each change. This means that the average amplified output current of the potentiometer 10 (the portion that flows through the contact $g_2$) must be very closely equal and opposite to the input drive current $r$. This, in turn, means that the conductance G of the portion of the potentiometer between the member 13 and the terminal 12 or the potentiometer output conductance must be proportional to $r$ or $G=Kr$. If the switching rate is very high, the conductance of the potentiometer output will be very nearly the same when the arm is on the other contacts and will thereby multiply the various potentiometer exciting voltages (in this case $m_1$, $m_2$, $m_3$, $l_1$, $l_2$ and $l_3$ by the conductance $G=Kr$.

It could hardly be expected that the time on contact would be very constant or the same for all contacts, so a peak voltage scheme is used. In order to insure that there exists an appreciable time during which the contacts $T_1$, $T_2$ and $T_3$ are in engagement with the corresponding fixed contacts, the contacts $T_1$ and $T_3$ are made wider than the contact $T_2$.

The high impedance amplifiers or integrators 24 to 29 are used to amplify the arm outputs.

It should be noted that the exact mechanical position of the arm 13 is not important so long as the potentiometer retains its conductance over a switching cycle. This means that the potentiometer need not be linear nor is long time stability required. However, any large variations in voltage coefficient between sections of the potentiometer should be avoided. The potentiometer need not have a large angular or linear travel so long as its grain is fine enough. All this indicates the use of a small carbon potentiometer of restricted angular travel. With a given torque inertia ratio available in the driving motor, a wider servo frequency response is possible because of less inertia and less travel.

The modification of FIG. 2 is shown as adapted to evaluate the product of two factors $x$ and $y$. In this modification, the commutator of FIG. 1 is replaced by a pair of vibrators 40 and 41. The fixed contacts of the vibrator 41 are spaced wider than those of the vibrator 40 so that the contacts of the vibrator 40 are engaged for a relatively short time and during the central part of the time during which the contacts of the vibrator 41 are closed. The resulting effect is the same as that produced by making the contacts $T_1$ and $T_3$ of FIG. 1 wider than the contact $T_2$.

The vibrator 40 includes a pair of fixed contacts 42 and 43 which are arranged to cooperate with a movable contact 44 and an operating coil 45 which may be energized from a 60 cycle source (not shown). The vibrator 41 includes a pair of fixed contacts 46 and 47 which are arranged to cooperate with a movable contact 48 and an operating coil 49 which may be similarly energized.

The vibrators 40 and 41 have their operating coils 45, 49 excited so that the movable contacts 44, 48 are moved in unison. This is done by making certain that the exciting current is applied with the same phase to the respective exciting coils. In this manner, movable contact 44 contacts fixed contact 42 only when movable contact 48 contacts fixed contact 46, and movable contact 44 contacts fixed contact 43 only while movable contact 48 contacts fixed contact 47. An alternative method for insuring this operation is to have all the contacts within a single vibrator and to operate both movable contacts simultaneously with a single exciting coil.

A voltage representative of the value of the factor $y$ is applied through a lead 50 to the contact 42 of the vibrator 40. To the other fixed contact 43 of this vibrator is applied the voltage of a standard source 51. When a switch 52 is in its right hand closed position, the vibrator 40 functions to connect the input of an amplifier 53 alternately to the lead 50 and to the source 51.

The amplifier 53 may be similar to that disclosed in my copending application Ser. No. 90,358 filed April 29, 1949. As explained in this copending application, the amplifier 53 is stabilized for gain by overall feedback and is otherwise stabilized so that its input and output voltages have their zero values simultaneously.

Output from the amplifier 53 is supplied (1) to the input of a similar amplifier 54 and (2) through a lead 55 to a multiplying potentiometer 56 which has its contact 57 positioned by a servomotor 58. Output voltage from the amplifier 54 is applied through a lead 59 to the other terminal of the multiplying potentiometer 56. Due to the phase reversal effect of the amplifers 53 and 54, the potentials at the opposite ends of the potentiometer 56 are of opposite polarity. The voltage between these ends is proportional to the value of the factor $y$. As hereinafter explained, the movable contact 57 is positioned according to the value of the other factor $x$ so that there is available at a lead 60 a voltage representative of the value of the product $x$ times $y$.

A voltage representative of the value of $x$ is applied through a lead 61 and a summing resistor 62 to the input of an amplifier 63 which corresponds to the amplifier 19 of FIG. 1. The output of the amplifier 63 is supplied through a harmonic filter 64 to the input of an amplifier 65 which corresponds to the amplifier 20 of FIG. 1 and delivers its output to a filter network 66. The harmonic filter 64 and the filter network 66, which correspond to the smoothing network 21 of FIG. 1, are here connected in the signal channel instead of in the external feedback of the servo as in the case of FIG. 1. This has been found to provide a somewhat smoother frequency response with respect to the signal (in this case the variable $x$).

A balanced modulator 67 functions to convert the D.C. output of the network 66 to 400 cycles. To this end, the modulator 67 is energized from a lead 68 through a variable inductor 69 and a transformer 70.

The output of the modulator 67 is supplied to the stator winding 71 of the servomotor 58 which has its other stator winding 72 energized through a lead 73.

The shaft of the servomotor 58 (indicated by a broken line) functions to position the contact 57 of the multiplying pontentiometer according to the value of $x$ in the same manner as that set forth in connection with the contact 13 and the motor 18 of FIG. 1. Thus with the switches 74 and 75 closed in their right hand positions, the contact 57 is connected through the lead 60 and the switch 74 to the movable contact 48 of the vibrator 41 and the fixed contact 47 of this vibrator is connected through the switch 75 and the external feedback loop 76 to a summing resistor 77 which (1) corresponds to the resistor 22 of FIG. 1, (2) is connected to the input of the amplifier 63 and (3) is interconnected with a filter capacitor 78 for smoothing the feedback voltage by which proper adjustment of the contact 57 is effected.

Under these conditions, there is made available at the fixed contact 46 of the vibrator 41 and at the output lead 79 of the multiplying device a voltage which is representative of the value of the product of $x$ times $y$.

An important feature of the multiplying device is a derivative potentiometer 80 which is energized from a source 81 and has its movable contact 82 positioned by the shaft of the servomotor 58. The voltage thus made available at the contact 82 is differentiated by a capacitor 83 and the differentiated voltage is applied through a resistor 84 to the input of the amplifier 65 for damping in the servo loop. The derivative potentiometer 80 does not have to be particularly accurate for the reason that it provides only damping and has no effect on the final value of the setting of the multiplying potentiometer 56.

While the switches 52, 74 and 75 have been shown as of the double throw type, this is not essential unless it is desired to put the device in such a condition that it may be operated as an ordinary servo in which case the switches are closed in their left hand positions.

Operation of the device connected as shown in FIG. 2 showed negligible overshoot for the $x$ and $y$ variables and maximum absolute peak errors in the *xy* product of approximately one part in one thousand.

What the invention provides is a time sequenced servo multiplier which does not involve the use of highly accurate components and operates with a degree of accuracy sufficient for many conditions encountered in the use of such devices.

What is claimed is:

1. In a device for multiplying a multiplicand *m* by a multiplier *r*, a potentiometer having a pair of input terminals and a movable arm, a first voltage source of standard value, a second voltage source representative of the value of *m*, a pair of input switches for connecting said input terminals alternately to said first and second sources, an amplifier, a high impedance output circuit having a capacity shunted input and an output coupled to the input of said amplifier, an output contact, a third switch for connecting said movable arm alternately to said high impedance circuit and to said output contact, means for applying to the input circuit of said amplifier a voltage representative of the value of *r*, constant speed means for controlling the operation of said switches, and means responsive to the output of said amplifier for positioning said movable arm of said potentiometer proportional to the value of *r*.

2. A device of the type set forth in claim 1 wherein the potentiometer is of the granular carbon type.

3. A device of the type set forth in claim 1 wherein the high impedance output circuit includes an amplifier having a high input impedance.

4. A device of the type set forth in claim 1 wherein the movable contacts of the pair of end terminal switches are wider than that of the third switch.

5. A device of the type set forth in claim 1 wherein the values of the potentiometer resistance and the capacitance of the capacitor are so related that the capacitor is charged nearly to the potentiometer arm voltage of said output terminal in a time negligible as compared to the time during which the switches are closed.

6. A device of the type set forth in claim 1 wherein the impedance of the output circuit of the potentiometer is so high that the capacitors are negligibly discharged between closures of the switches.

7. In a device for multiplying a first variable by a second variable, the combination of a potentiometer having a pair of input terminals and a movable arm, a first voltage source of standard value, a second voltage source representative of the value of said first variable, means for connecting said input terminals alternately to said first and second sources, a third voltage source which is representative of the value of said second variable, means including a servomotor connected to respond to said third voltage source for positioning said movable arm according to the value of said second variable, means for producing a voltage dependent on movement of the shaft of said servomotor, means for differentiating said voltage, and means for applying said differentiated voltage to damp oscillation of said servomotor.

8. In a device for multiplying a first variable by a second variable, the combination of a potentiometer having a pair of input terminals and a movable arm, a first voltage source of standard value, a second voltage source representative of the value of said first variable, means for connecting said input terminals alternately to said first and second source, a third voltage source representative of the value of said second variable, and means including a servomotor connected to respond to said third voltage source and coupled to said potentiometer movable arm to position it proportional to the value of said second variable.

9. In a device for multiplying a first variable by a second variable, the combination of a potentiometer having a pair of input terminals and a movable arm, a first voltage source of standard value, a second voltage source representative of the value of said first variable, means for connecting said input terminals alternately to said first and second sources, a third voltage source representative of the value of said second variable, a servomotor, means coupling said servomotor to said third voltage source to be responsive thereto, the shaft of said servomotor being coupled to said potentiometer movable arm to position it proportional to the value of said second variable, an output terminal, and means for alternately connecting said movable arm to said output terminal and to said means coupling said servomotor to said third voltage.

10. A device for multiplying a first voltage by a second voltage comprising a potentiometer having a pair of input terminals and a movable arm, a source of standard voltage, a first switching means to apply alternately said first voltage or said standard voltage to said potentiometer input terminals, an output lead, a feedback lead, a second switching means electrically coupled to said potentiometer movable arm to apply the output thereon alternately to said output lead and to said feedback lead, means to synchronize said first and second switching means to apply said first voltage to said potentiometer input terminals when said output lead is connected to said potentiometer movable arm and to apply said standard voltage to said potentiometer input terminals when said feedback lead is connected to said potentiometer movable arm, a servo motor mechanically connected to said potentiometer movable arm, and means to which said second voltage is applied and said feedback lead is coupled to control said servo motor to move said potentiometer movable arm until said potentiometer arm is positioned proportional to said second voltage whereby the average output voltage appearing at said output lead is proportional to the product of said first and second voltages.

11. A device as recited in claim 10 wherein said means to control said servo includes a harmonic filter, a filter network having its input connected to said harmonic filter network and balanced modulator means to convert the D.C. voltage output of said filter network to a 400 cycle voltage.

12. A device as recited in claim 10 wherein there is included a second potentiometer having a pair of input terminals and a movable arm, said movable arm being mechanically coupled to said servo motor to be positioned thereby, a fixed voltage source connected across said potentiometer input terminals, a differentiating network electrically connected to said movable arm, and means to apply said differentiating network output to said means to control said servo motor to damp the motion of said servo motor.

References Cited in the file of this patent

"Electrical Analogue Computing" by D. J. Mynall, Electrical Engineering, July 1947, pages 214–217.